(12) United States Patent
Peterson

(10) Patent No.: US 7,266,937 B2
(45) Date of Patent: Sep. 11, 2007

(54) RETRACTABLE SAFETY HORSE TYING APPARATUS

(75) Inventor: Mark Peterson, Braham, MN (US)

(73) Assignee: Smart Tie LLC, Hugo, MN (US)

( * ) Notice: Subject to any disclaimer, the term of this patent is extended or adjusted under 35 U.S.C. 154(b) by 51 days.

(21) Appl. No.: 11/111,742

(22) Filed: Apr. 21, 2005

(65) Prior Publication Data
US 2005/0262816 A1    Dec. 1, 2005

Related U.S. Application Data

(60) Provisional application No. 60/565,263, filed on Apr. 23, 2004.

(51) Int. Cl.
*B68B 1/00* (2006.01)
(52) U.S. Cl. .......................................................... 54/34
(58) Field of Classification Search .................... 54/34; 119/794, 796, 773, 783
See application file for complete search history.

(56) References Cited

U.S. PATENT DOCUMENTS

| | | | |
|---|---|---|---|
| 4,621,589 A * | 11/1986 | Thinnes ..................... | 119/770 |
| 4,762,089 A * | 8/1988 | McNulty .................... | 119/796 |
| 5,377,626 A * | 1/1995 | Kilsby et al. ............... | 119/796 |
| 5,890,456 A * | 4/1999 | Tancrede .................... | 119/794 |
| 6,170,775 B1 * | 1/2001 | Kovacik et al. ............ | 242/404 |
| 6,672,329 B1 * | 1/2004 | Brooks et al. ........... | 137/355.2 |
| 6,845,736 B1 * | 1/2005 | Anderson ................... | 119/796 |

* cited by examiner

*Primary Examiner*—Thomas Price
(74) *Attorney, Agent, or Firm*—Janet Peyton Schafer

(57) ABSTRACT

A retractable safety horse tying apparatus having a housing which is shaped to receive a spring-loaded reel that rotates about a center spindle. A tether rope or other material is wound around the reel and anchored there and the opposite end threaded through a hole on the housing and attached to fusible link and fed onto the exterior of the reel. A spring is mounted internally of the reel and attaches to the reel. A fusible link is mounted on the outside of housing such that the fusible link permits rope to be played out from the reel in response to pressure applied to the rope. The fusible link permits the rope to be pulled out from a position straight in front of the device and also from an angle. This permits the tether rope to be automatically fed out in response to anxious pulling by a tethered horse, or other animal. The spring-loaded reel, compressed when the tether rope is being played out, automatically retracts the tether rope in response to the spring loosening as a result of the frightened animal calming.

11 Claims, 3 Drawing Sheets

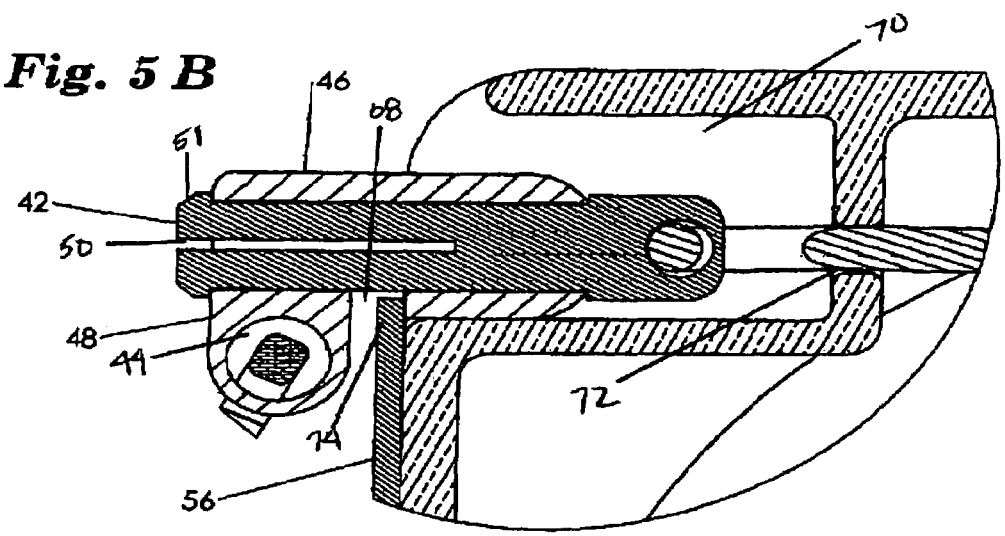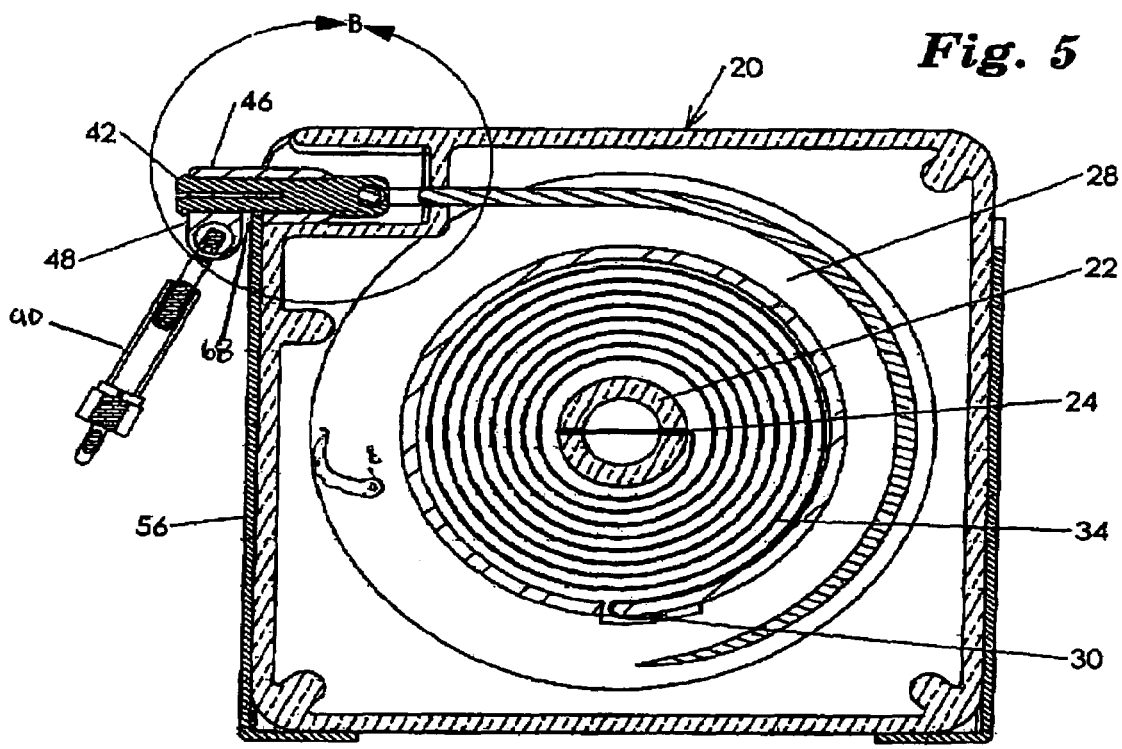

RETRACTABLE SAFETY HORSE TYING APPARATUS

BACKGROUND

This application is a non-provisional application filed under 35 U.S.C. §111(a) claiming the filing date of provisional application 60/565,263 filed Apr. 23, 2004.

The present invention relates to the tethering of animals, and in particular, it relates to the tethering of horses in such a manner to prevent injury to the horses.

Animal tethering has been accomplished using ropes, specialized lead ropes and even bungee-type leads. A problem with previous methods of tethering horses is that if the horse becomes frightened and pulls back sharply, being tied to a stationary object exacerbates their fright by adding pressure to the poll or back of their head. Being fixedly tethered, the frightened horse pulls until they get free either injuring themselves, the wall, trailer, person nearby or breaking their halter and/or lead. The bungee-type leads provide a minimal amount of flexibility to the frightened horse. When a horse on a bungee type lead or tie-up pulls back, eventually the bungee breaks shooting the hasp or lead shank through the air possibly injuring a bystander.

SUMMARY

The present invention is directed to a retractable safety horse tying apparatus that satisfies these needs to provide a safe yet flexible means for tethering a horse which feeds out the tether when the horse is frightened and automatically gently retracts the tether when the horse is calm. The retractable safety horse typing apparatus prevents injury to the frightened horse by providing an alternative to being tied tightly to a fixed post. The apparatus includes an emergency break element that prevents injury to a horse in extreme fright conditions and prevents injury to the area immediately adjacent the horse, including trailer, wall, and/or people. A retractable safety horse tying apparatus having features of the present invention comprises a housing which is shaped to receive a spring-loaded reel that rotates about a center spindle. Rope or other material is wound onto the reel and threaded through a fusible link. A short horse lead rope or trailer tie can be fastened directly to the fusible link or the fusible link can be attached directly to the halter. The fusible link is mounted on the outside of housing such that the fusible link locks into place in it's normal position of use, holding the horse or other animal tethered thereto. The fusible link is of a diameter too large to be pulled into the device yet is under tension from the spring. The fusible link, in a first position, permits the rope to be played out from the reel in response to pressure raising the fusible link upwardly or to the side from the locked first position by a horse that "spooks" and tries to flee. In a second position, the device permits the rope to be pulled out at will yet applying steady pressure to pull the horse back to a position adjacent the apparatus. The first locked position permits the tether rope to be automatically fed out in response to anxious pulling by a tethered horse, or other animal because a "spooked" horse will raise its head and back away. The spring, compressed when the tether rope is being played out, automatically retracts the tether rope, applying pressure to the horse to return to the starting site adjacent the retractable safety horse tying apparatus. The spring, compressed when the rope is played out, automatically returns to it's tightly coiled position in response to the spring loosening as a result of the frightened animal calming, pulling the horse back to a site.

An additional embodiment provides for a beak into which the fusible link releasably fits. This beak provides the emergency release element, an emergency break element, that prevents harm to the horse under extreme provocation. The beak has a loop for fastening the horse thereto by means of a shortened lead rope or directly to the horse halter in the same manner as the fusible link. The beak has a first locked position which permits minimal movement of the horse and a second position that allows a "spooked" horse to pull backwards from the apparatus several feet without breaking the tether rope. Again, when the horse calms, automatic pressure from the spring returns to its original shape and pulls the horse back to the original tethering site. In extreme fright conditions the tether rope breaks at the point of the fusible link/beak connection preventing the from injuring itself in it's struggle to get away. The emergency break element limits damage to the trailer, wall or any person adjacent the tethering site. Additionally, use of a short lead provides a strap that remains on the horse and aids in recapture.

The device of this invention can also be used in training a horse or other animal to stand at a site while acts are performed on the horse which the horse perceives as potentially frightening, such as clipping, mane pulling, mane braiding, etc. without the use of tranquilizers. The training method allows the horse to back away from the potential frightening situation, then pressure on the tether brings the horse back to the original site. The horse learns to cope with the situation.

For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

Understanding of the invention will be enhanced by referring to the accompanying drawings, in which like numbers refer to like parts in the several views and in which:

FIG. 5 is a cross-sectional view of FIG. 4;

FIG. 5B is a enlarged view of the fragment indicated at FIG. 5.

DETAILED DESCRIPTION OF THE CURRENTLY PREFERRED EMBODIMENTS

Figure 2:
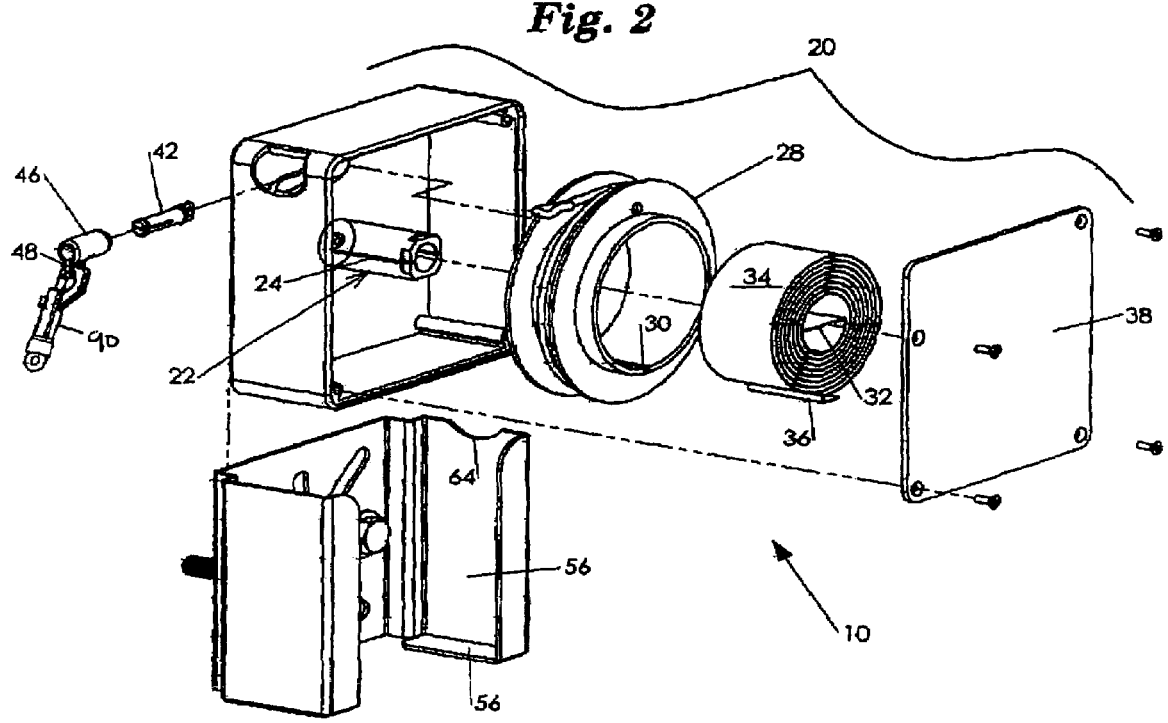
FIG. 2 is an exploded view of the device of this invention.

Understanding of the invention will be further enhanced by referring to the following illustrative but non-limiting example.

A retractable safety horse tying apparatus 10 comprises a generally square-shaped housing 20 which is shaped to receive a spring-loaded reel 28 that rotates about a center spindle 22. Rope or other material is threaded through a fusible link 42 and fed onto the exterior of the reel 28. A spring 34 is mounted internally of the reel 28. The fusible link 42 is mounted outside the housing 20 within a beak 46 which acts as a bushing protecting the fusible link from frictional damage. It is noted that the fusible link 42 could be directly attached to the lead rope or horse halter. The beak 46 provides the safety emergency release element because it permits a controlled break in the tether rope 25 between the fusible link 42 and the beak 46 in case of emergency when the horse tries to bolt away. Positioned on the outside of housing, fusible link permits rope to be played out from the reel in response to pressure applied to the rope. The fusible link 42 permits the rope to be pulled out from a position straight in front of the device and also from an angle. This permits the tether rope to be automatically fed out in response to anxious pulling by a tethered horse, or other animal.

In an additional embodiment, the beak 46 with the fusible link 42 releasably mounted therein, sits on the outside of housing 20. The beak 46 has a groove 68, shown at FIGS. 3, 5 & 5B, formed therein such that beak 46 sits on a straight edge of housing mount 56. This permits the beak 46 with attached fusible link 42 and tether rope 25 to be locked in place adjacent the housing mount side edge permitting only minimal movement by the tethered. If the horse lifts it's head and pulls straight outwardly or at an angle from the apparatus, 10, the groove 68 of the beak 46 is lifted from it's locked position on the upper edge of housing mount 56 and permits the horse to pull out the tether rope a distance from the apparatus 10 such as when the horse "spooks" and tries to rim away. So long as the horse doesn't use extreme force to run away, the tether rope will stay intact under normal "spooking" conditions, and as soon as the horse calms, automatically pull the tether rope and horse back to the starting position. A bevel 64 formed in one side of the housing mount 56 such that the beak 46 and fusible link 42 are not locked in position but rather in an unlocked position adjacent the bevel 64, permits the horse to pull backwardly and receive more tether rope at will. The spring-loaded reel 28 automatically puts pressure on the rope 25 and in turn on the halter which pressure the horse, pulling the horse back to the starting position. The user locks the apparatus by inserting the apparatus into the housing mount such that the beak 46 is on the opposite side of the housing mount bevel 64. The fusible link 42 permits the rope to be pulled out from a position straight in front of the device and also from an angle. This permits the tether rope to be automatically fed out in response to pulling by a tethered horse. The spring 34 of the spring-loaded reel 28 while compressed when the tether rope is being played out, automatically retracts the tether rope applying pressure along the tether rope to the horse, in response to the spring loosening as a result of the frightened animal calming, reeling in the horse.

Figure 1:
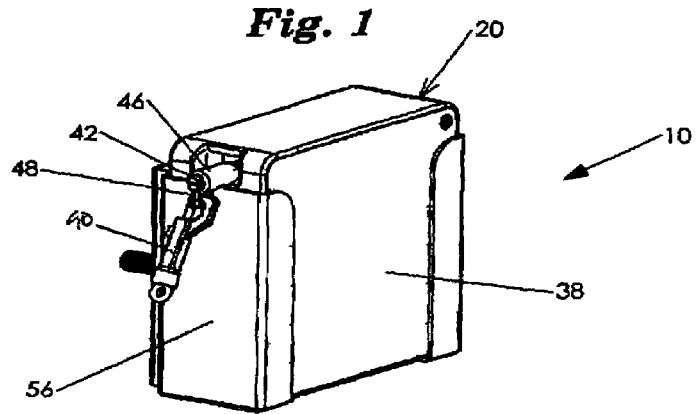
FIG. 1 is a perspective view of the device of this invention.

Turning now to the drawings, in which like reference characters refer to corresponding elements throughout the several views, FIG. 1 illustrates the retractable safety horse tying apparatus 10. The assembled invention comprises a housing 20 that includes a spring-mounted reel with tether rope attached thereto and fed outside the housing by means of a fusible. A beak 46 can also be provided as part of the emergency release element. The apparatus 10 is shown in FIG. 6 with a lead rope or trailer tie positioned between the horse and the retractable safety horse tying apparatus 10 although it is understood that a snap could be used at the end of the apparatus 10 to directly attach the horse. It is understood that the apparatus could also be mounted to a post, wall, trailer or other fixed body.

FIG. 2 is an exploded view of the device of this invention with the housing 20, of resilient plastic, metal or other resilient materials, shown with a centrally placed spindle 22 mounted internally thereof the spindle 22 having a slot 24 for receiving a first end 32 of a flat spring 34. A second end of spring 36 is received by a slit 30 in reel 28, also of resilient plastic or other resilient materials. Tether rope 25 is wound around reel 28, a first end threaded through an opening 26 formed in reel 28. A second end of tether rope 25 is threaded through an aperture 44 in fusible link 42, fusible link of a plastic rubber hybrid material such as that made by Metro Molded Parts, Coon Rapids, MN shown in detail in FIGS. 5 and 5B. In actual use conditions, fusible link 42 has a durometer strength between 50 and 100. In actual use conditions, a metal coil spring 34 of a strength to apply between 15 and 25 pounds of pressure has been used although other amounts of pressure could be used as needed, as resistance to the tether rope being played out and on the horse to draw it back to the original tethering site.

Assembled housing 20 has a face plate 38 mounted by fastening means, such as screw fasteners as shown, to main housing cavity 21 enclosing the positioned spring 34 loaded reel 28 about the spindle 22. Assembled housing 20 is received by housing mount 56 which is generally U-shaped and has flanges 58 surrounding the open sides as means provided to receive and retain assembled housing 20. In actual use conditions, housing mount 56 has cut-outs formed therein for receiving fastening means, such as screw fasteners, for mounting the assembled horse retracting apparatus to a post, wall, trailer or other stationary object.

Figure 3:
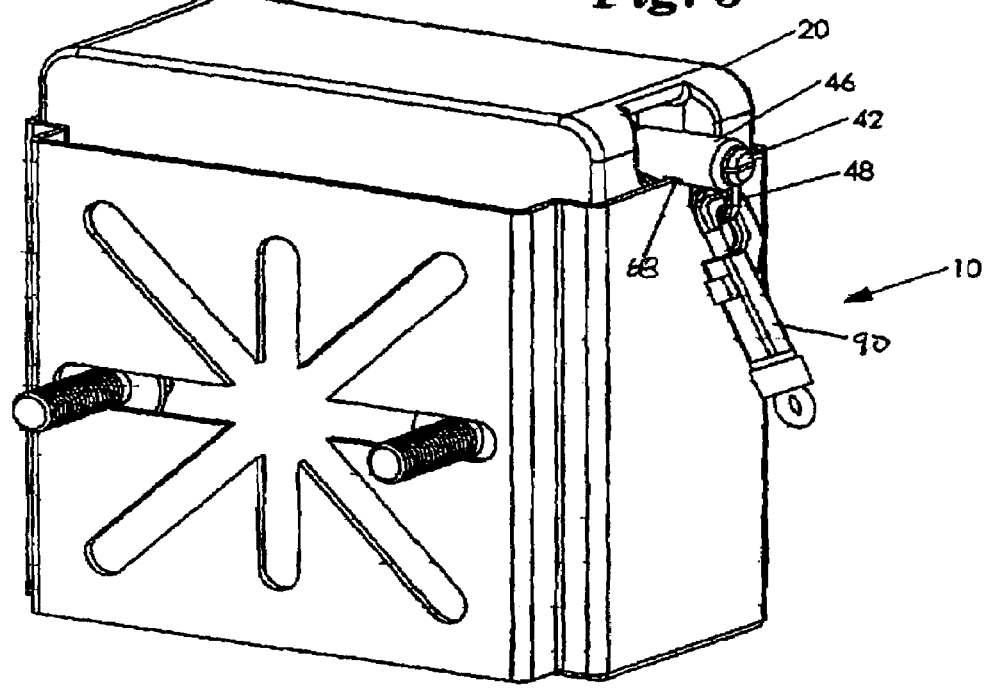
FIG. 3 is a side perspective view of the device of this invention from the back.

FIG. 3 is the back side view of the assembled retractable safety horse tying apparatus 10 with the housing mount cut-outs 60 shown with screw fasteners shown.

Figure 4:
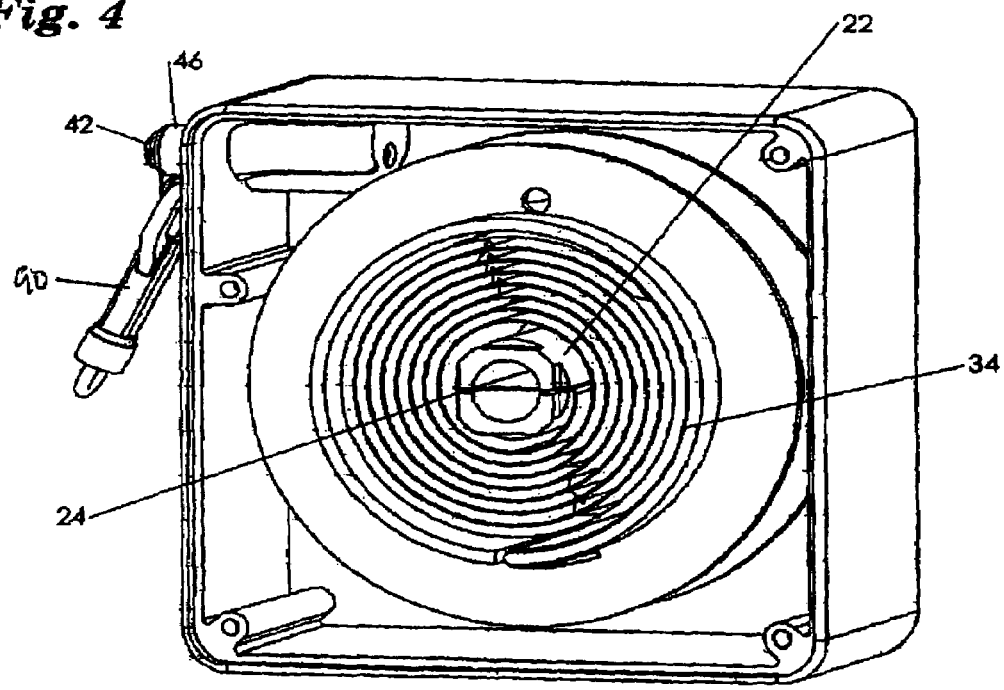
FIG. 4 is a side perspective view of the device of this invention with the face plate removed.

FIG. 4 shows the assembled retractable safety horse tying apparatus 10 with the face-plate 38 removed to allow understanding of the parts in their placement within the housing 20.

FIG. 5 is a cross-sectional view of FIG. 4 with a pocket 70 indicated such that fusible link 42 has an aperture 44 for receiving an end of tether rope 25.

As shown in FIGS. 5 & 5B, tether rope 25 is threaded through a hole 72 in the housing 20 that leads to a pocket 70. Fusible link 42, of a diameter larger than that of hole 72 remains on the outside of housing 20. An embodiment of this invention provides an attachment site on fusible link 42 for receiving the lead rope or means for attaching the horse halter directly. A beak 46, of metal or other resilient material, is provided to receive fusible link 42. Fusible link 42 has a cleft 50 formed in the end permitting fusible link 42 to be compressed for passage into beak 46 which is tube-shaped and acts as a bushing protecting fusible link 42 from frictional damage by the side edge 74 of housing mount 56. Fusible link 42 of malleable material, is installed in beak 46 by compressing the cleft end and press fitting the fusible link 42 into beak 46. Fusible link 42 has a rim 51 that protrudes from the outer edge of beak 46 such that it retains fusible link 42 in place within beak 46. Beak 46 has a groove 68 that catches the upper side edge of housing mount 74 such that the tether rope 25 attached to fusible link 42 at aperture 44 doesn't play out but remains locked in place when the horse pulls downwardly on the beak 46 as if to graze. Beak 46 and fusible link 42 act together as a lever to prevent the beak 46 from being pulled out of the housing pocket. If the hose "spooks" and pulls away from the apparatus 10 from a position straight in front of the apparatus LO or by pulling upwardly, beak 46 is released from the edge of housing mount 74 and permits the tether rope 25 to be played out a limited distance. In actual use conditions, a tether rope of approximately 25 feet has been provided although other lengths of rope could be utilized as needed. If the horse reacts strongly and tries to bolt, the tether rope 25 breaks by pulling the fusible link 42 free from beak 46 preventing damage to the apparatus 10 and it's surroundings.

In use, in response to the rope being pulled or played out, the reel 28 spins on center spindle 22. Once the attached horse is calmed, the spring 34 overcomes the pulling out of the rope and the reel 28 rotates about the center spindle 22 such that the rope is retracted back into the apparatus 10 and the attached horse is gently pulled back to a start position adjacent the apparatus 10. The assembled housing 20 maybe placed in the housing mount 56 such that the groove 68 of beak 46 catches on the upper edge of housing mount side edge 74, which is the locked position, locking the beak 46 such that the tether rope 25 does not play out as the horse stands and tries to lower it's head to eat. If the horse "spooks" or raises its head and backs away, the apparatus permits the tether rope to gently play out allowing the horse to move away. Once the horse settles down, the apparatus 10 automatically applies pressure and pulls the tether rope and attached horse back to the start position. If the user removes the apparatus 10 from the housing mount 56 and simply reverses the apparatus 10 such that the beak 46 is adjacent the bevel 64, the unlocked position, the horse can pull out the tether rope at will. Lead rope snap is indicated at 90 in FIGS. 1, 2, 4 & 5.

Additionally, the apparatus could be directly mounted to a post, wall or trailer.

The method of use of the apparatus of the invention permits training a horse that reacts to provocative incidents, such as use of clipper, debris moving past the horse because of wind, and the like, to ignore such provocations by allowing the horse to back away from the provocation and then because pressure is consistently gently and automatically applied, the tether rope and the now calm horse are pulled back to a start position. This trains the horse to stand quietly in the face of provocation.

Although the present invention has been described in considerable detail with reference to certain preferred versions thereof, other versions are possible. For example, an angled mount could be used to fasten the apparatus to a post, wall, trailer or other object. A housing mount of a different shape could also be used.

Changes and modifications in the specifically described embodiments can be carried out without departing from the scope of the invention which is intended to be limited only by the scope of the appended claims.

I claim:

1. A retractable horse tying apparatus comprising:
   a) a housing;
   b) a spindle mounted within said housing;
   c) a spring-loaded reel mounted on said spindle within said housing;
   d) a tether rope wound around said reel;
   e) attachment means for releasably attaching a horse to the apparatus such that the tether rope may be fixed in a locked position, restraining movement of the horse; and
   f) an emergency break element to allow a controlled break in the tether rope.

2. The apparatus of claim 1, wherein said attachment means further comprise a fusible link.

3. The apparatus of claim 2, further comprising means for fastening the apparatus to a fixed location.

4. The apparatus of claim 3, wherein said means for fastening the apparatus to a fixed location further comprises a housing mount.

5. The apparatus of claim 1, wherein said attachment means for releasably attaching a horse to the apparatus such that the tether rope may automatically play out as the horse moves away from the apparatus yet automatically recalling the horse as the tether rope retracts.

6. The device of claim 1, wherein said emergency break element further comprises a beak whereby said tether rope breaks at a selected position to provide a break from the tether device in a controlled, safe manner.

7. A retractable horse tying apparatus comprising:
   a) a housing;
   b) a spindle mounted within said housing;
   c) a spring-loaded reel mounted on said spindle within said housing;
   d) a tether rope wound around said reel; and
   e) attachment means for releasably attaching a horse to the apparatus such that the tether rope may be fixed in a locked position, restraining movement of the horse and permitting the horse to back away in response to provocation yet automatically recalling the horse as the tether rope retracts; and
   f) a fusible link as means for releasably attaching a horse to the apparatus and to provide a point for controlled break to prevent injury to the tethered horse and its surroundings.

8. The apparatus of claim 7, further comprises a housing mount as attachment means for fastening the apparatus to a fixed location.

9. The apparatus of claim 7, further comprising a beak as means for releasably attaching a horse to the apparatus.

10. A retractable horse tying apparatus comprising:
    a) a housing;
    b) a spindle mounted within said housing;
    c) a spring-loaded reel mounted on said spindle within said housing;
    d) a tether rope wound around said reel;
    e) attachment means for releasably attaching a horse to the apparatus such that the tether rope may be fixed in a locked position, restraining movement of the horse and permitting the horse to back away in response to provocation yet automatically recalling the horse as the tether rope retracts;
    f) a fusible link as means for releasably attaching a horse to the apparatus;
    g) a beak as further attachment means for releasably attaching a horse to the apparatus; and
    h) an emergency break element to allow the horse to break away from the tether device in a controlled, safe manner.

11. The method of use of the apparatus of this invention as a training apparatus, comprising the steps of:
    a) tethering a horse to the apparatus;
    b) providing provocation;
    c) allowing a horse to back away from the provocation; and
    d) applying pressure automatically to retract the tether rope and pulling the now calm horse back to a start position.

* * * * *